Dec. 10, 1968   A. J. KORECKY ET AL   3,415,551

BALL JOINT ASSEMBLY

Filed May 15, 1967

INVENTORS
ALLAN J. KORECKY
HENRY A. TESMER
BY
Meyer, Tilberry & Body
ATTORNEYS.

United States Patent Office 3,415,551
Patented Dec. 10, 1968

3,415,551
BALL JOINT ASSEMBLY
Allan J. Korecky, Chagrin Falls, and Henry A. Tesmer, Macedonia, Ohio, assignors to Barmatic Machines Incorporated, Cleveland, Ohio, a corporation of Ohio
Filed May 15, 1967, Ser. No. 638,291
7 Claims. (Cl. 287—90)

ABSTRACT OF THE DISCLOSURE

A ball joint assembly having a ball member and a separate annular bearing ring mounted on a stud, in a socket. The ring has a larger inside diameter than the stud diameter, permitting the ring to slide during most of the pivotal travel of the stud. When the stud reaches the limit of its pivotal travel, the ring bearingly engages the socket and resists forces tending pivotally to dislodge the ball member and stud from the socket.

In a modified arrangement the ring is provided with lobe portions and its periphery which resist axial forces tending to dislodge the ball member and stud from the socket.

---

This invention relates to the art of bearing joints and more particularly to improved ball joint assemblies.

The present invention is particularly applicable for use in steering linkages and wheel suspension systems for automotive vehicles, and it will be described with particular reference thereto; however, it will be appreciated that the invention has broader applications and may be used in any environment where ball joint assemblies serve useful functions.

Ball joint assemblies of the type to which the present invention is addressed, generally comprise a socket having at least one open end and an internal bearing surface converging toward the open end; a stud operative for rotational and pivotal movement with respect to the socket, having a head positioned within the socket and a generally cylindrical shank portion extending freely through the open end of the socket; and a ball member positioned in the socket, having a frusto-conical external bearing surface complementary to, and bearing against, the internal bearing surface of the socket, and a center opening slidably receiving the shank portion of the stud. The bearing surfaces of the ball member and the socket are maintained under compression, usually by spring means fitted within the socket and in pressure engagement with the head of the stud.

The two prime requisites for a commercially acceptable ball joint assembly, are first that it be of rugged construction so as to withstand the extremely rough usage to which it is subjected, and second, that it be as inexpensive to manufacture as possible. Ball joint assemblies used in automotive steering linkages and wheel suspension systems, receive less attention today than they did a few years ago. Today, many such ball joints are factory lubricated and sealed, and automotive manufacturers recommend additional lubrication services only at infrequent intervals of 20,000 to 30,000 miles and more. This is in contrast to earlier practices of lubricating and inspecting ball joints, tie rod ends, and the like, every 1,000 to 2,000 miles. Consequently, there is no longer provided the opportunity of inspecting ball joints frequently for wear and excessive "play."

Ball joints which give satisfactory service for extended periods of time with infrequent lubrication, are expensive to manufacture. Bearing surfaces have to be controlled to close tolerances so that lubricant is not lost, friction is kept at a minimum, and the joint is kept free of foreign abrasive matter. Moreover, as cars become heavier, and are driven at higher speeds, ball joints are subjected to increasingly greater stresses. Consequently, there is a continuing need for ball joints of improved design and greater serviceability. The present invention is directed to filling this need.

One of the specific problems frequently encountered in ball joint assemblies of conventional design is a "popping out" of the ball and stud from the socket when the ball joint is subjected to extreme axial or pivotal forces. Such forces are brought to bear on a ball joint when the wheel suspended by the joint engages a chuckhole, curbing or some similar obstruction. Popping is more likely to occur in a ball joint which has been in service long enough to develop a degree of free play through wear. Infrequent inspection of ball joints permits progressive deterioration to go unnoticed which may account for what appears to be an increasing number of incidents of ball joint failures due to popping.

The present invention is addressed to a ball joint assembly of improved construction which has much greater resistance to popping than do ball joint assemblies of conventional design. This is accomplished in accordance with the present invention by providing a ball joint assembly with means for generating auxiliary bearing surface area, temporarily, when the assembly is subjected to extreme axial and/or pivotal forces. When the ball joint assembly is subjected to less than extreme forces, the means for generating auxiliary bearing surface area assumes a dormant position and consequently is not subject to continuous wear as is true of the main bearing surface area of the ball joint assembly. As a result of this arrangement, the means for generating auxiliary bearing surface area maintains its effectiveness in preventing pop out, throughout the service life of the ball joint assembly, notwithstanding normal wear and free play development in the main bearing surface area of the assembly.

In accordance with a preferred embodiment of the present invention, a ball joint assembly of the type described is provided with an annular bearing ring mounted on the stud between the head thereof and the ball member. The ring is provided with an inside diameter sufficiently larger than the diameter of the shank portion of the stud, to permit the ring to shift transversely of the axis of the shank, and an edge portion of the ring to engage the bearing surface of the socket, when the stud pivots with respect to the socket.

When the stud is pivoted to the point where its shank contacts the opening in the socket, a fulcrum point is established which tends to force the head of the stud and the ball member out of the socket. By providing a slidable bearing ring above the ball member and under the head of the stud, additional mass or auxiliary bearing surface is brought to bear against the internal bearing surface of the socket when the stud is pivoted to the extreme limit permitted by the opening in the socket. This temporary application of auxiliary bearing surface, helps to resist the forces tending to dislodge the stud from the socket. When the forces acting on the stud are relieved and the shank portion moves out of contact with the socket, the bearing ring slides out of contact with the bearing surface of the socket.

In accordance with another aspect of the invention, the annular bearing ring may be provided with peripheral lobe portions operative to engage the inside wall of the socket and limit the axial extension of the shank portion of the stud through the open end of the socket. This arrangement is particularly useful where the ball joint assembly is subjected to extremely large axial forces.

It is therefore an object of the invention to provide a ball joint assembly of improved construction.

A further object of the invention is to provide a ball joint assembly which overcomes certain disadvantages of prior art assemblies.

A further object of the invention is to provide a ball joint assembly having means operative to generate auxiliary bearing surface area, temporarily, when the assembly is subjected to extreme forces.

These and other objects and advantages will become apparent from the following detailed description of a preferred embodiment of the invention when read in connection with the accompanying drawings in which.

Figure 1:
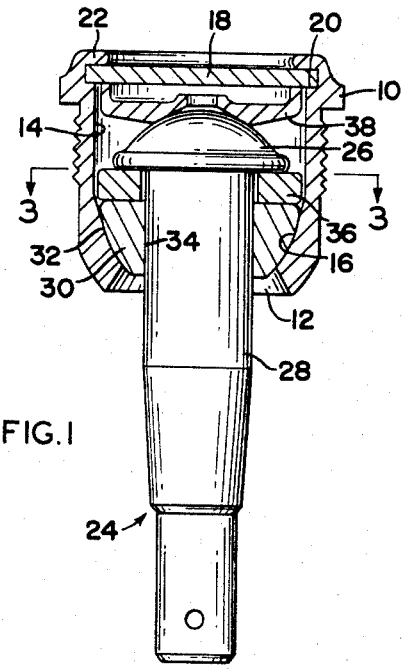
FIGURE 1 is a schematic view with parts in section, showing a preferred embodiment of the invention.

Referring now to the drawings wherein the showings are for purposes of illustrating preferred embodiments of the invention only, and not for the purpose of limiting the same, FIGURE 1 shows a ball joint assembly comprising a socket 10, having an open end 12, and an internal wall 14, a portion of which defines a bearing surface 16, converging toward open end 12. The other end of the socket 10 is closed, by any suitable means such as integral top, but in the preferred embodiment illustrated, the closure is formed by a cap 18 seated on a lip 20 formed in the internal wall 14 of socket 10 and held in place by folded down, integral rim 22. Cap 18 may be provided with a grease fitting or a removable plug (neither illustrated) which may be replaced by a grease fitting.

The ball joint assembly further comprises a stud designated generally as 24, operative for rotational and pivotal movement with respect to socket 10, comprising a rounded head 26 positioned in the socket, and a generally cylindrical shank portion 28 extending freely through open end 12 of socket 10.

Positioned within the socket is ball member 30, having a segmental spherical external bearing surface 32, complementary to and bearing against, bearing surface 16 formed on the internal wall 14 of socket 10. Ball member 30 is provided with a center opening 34 slidably receiving shank portion 28 of stud 24.

Mounted on stud 24 between head 26 and ball member 30, is annular bearing ring 36. This ring has an inside diameter sufficiently larger than the diameter of shank portion 28 of stud 24, to permit ring 36 to shift transversely of the axis of shank 28 when stud 24 pivots with respect to socket 10. In the preferred arrangement illustrated, the outside diameter of ring 36 is slightly larger than the largest outside diameter of ball member 30.

The ball joint assembly further comprises means for maintaining the bearing surfaces in compressive relationship with each other, which in the preferred embodiment shown, take the form of resilient pressure plate 38 positioned in contact with rounded head 26 of stud 24 and cap 18.

As best seen in FIGURE 1, when shank portion 28 and socket 10 are coaxially aligned, annular ring 36 is out of contact with the internal wall 14 of socket 10. When the shank is partially pivoted, the ring can slide to accommodate itself to the changing curvature of the socket wall. Thus, when the components of the ball joint are coaxially aligned, as well as when stud 24 is partially pivoted with respect to socket 10, the bearing surface area consists of that area in which segmental sperical external bearing surface 32 of ball member 30, is in contact with bearing surface 16 on socket 10.

Figure 2:
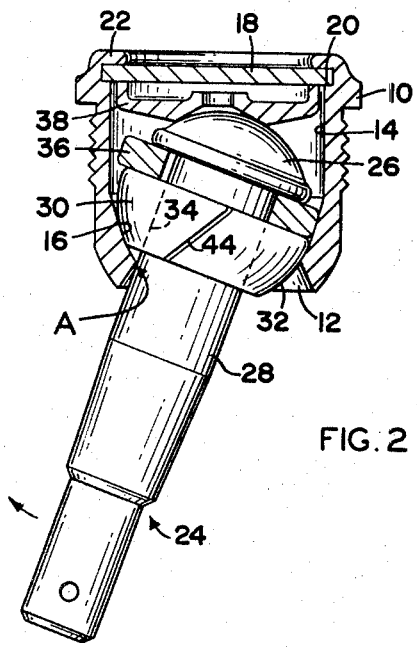
FIGURE 2 is a schematic view with parts in section, similar to FIGURE 1, but showing the stud pivoted to its extremely position.
Figure 3:
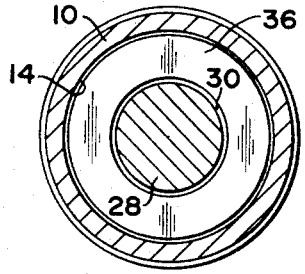
FIGURE 3 is a schematic section view taken generally along line 3—3 of FIGURE 1.

FIGURE 2 shows the interactions of the parts when stud 24 is in its full, pivoted position. As the pivoting action begins, annular ring 36, due to its larger internal diameter, will shift to the left as shown in the drawing, in response to the changing curvature of internal wall 14 of socket 10. When stud 24 reaches the limit of its pivotal movement, by contact of shank portion 28 with point A on socket 10, it will be seen that ring 36 simultaneously reaches the limit of its sliding movement, with its internal surface solidly engaging stud 24. If annular bearing ring 36 was not present, the force developed at fulcrum point A could be great enough to pry ball member 30 and stud 24 out of the confines of socket 10. However, with annular bearing ring 36 installed as shown in the drawings, the leading edge of the ring is in contact with bearing surface 16 on socket 10, thereby creating a temporary, auxiliary bearing surface area. The force exerted by ring 36 on bearing surface 16 counteracts the force developed at fulcrum point A, and substantially reduces the likelihood of the latter forces prying ball member 30 and stud 24 out of socket 10.

It will be understood from the foregoing discussion, that when stud 24 is in any position other than at the extreme limit of its pivotal movement, ring 36 is out of bearing engagement with socket 10, and is not subjected to wear. When stud 24 is pivoted to its extreme position, ring 36 generates auxiliary, temporary bearing surface area by bearing against surface 16, which reduces substantially the likelihood of the ball joint coming apart. As a consequence, the arrangement disclosed provides an assembly having improved resistance to pop out.

Figure 4:
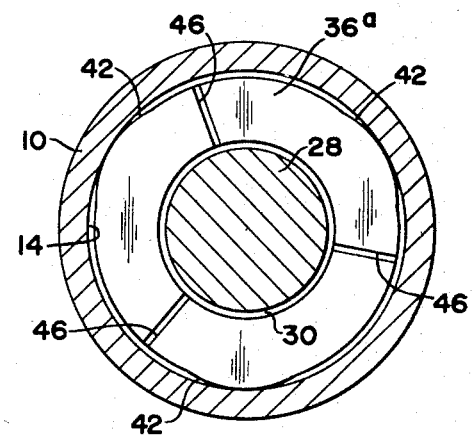
FIGURE 4 is a schematic section view showing a modified form of the invention.

FIGURE 4 shows a modification of the preferred embodiment of the present invention, wherein annular bearing ring 36a is provided with a plurality of lobes 42 along its periphery, which lobes are preferably symmetrically spaced. These lobes substantially increase the ability of the joint to resist axial forces. While three lobes are shown in the embodiment illustrated in FIGURE 4, it will be understood that the number of lobes can be varied to meet the strength requirements needed to adequately resist axial forces.

If desired, the ball member and/or annular bearing ring may be provided with grooves to facilitate the circulation of a lubricant throughout the interior of the socket. FIGURE 2 shows such a groove 44 provided on ball member 30, and FIGURE 4 shows such a groove 46 provided on annular bearing ring 36a.

The present invention has been described in conjunction with certain structural embodiments; however, it is to be appreciated that various structural changes may be made in the illustrated embodiments without departing from the intended scope and spirit of the present invention as defined in the appended claims.

Having thus described our invention, we claim:

1. A ball joint assembly comprising a socket having at least one open end, and an internal bearing surface converging toward said open ends; a stud operative for rotational and pivotal movement with respect to said socket, having a head positioned in said socket and a shank portion extending freely through said open end; a ball member positioned in said socket having a segmental-spherical external bearing surface complementary to, and bearing against, the internal bearing surface of said socket, and an opening slidably receiving the shank portion of said stud; and the means transversely slidably mounted on said stud between said head and said ball member operative to provide auxiliary bearing surface area, temporarily, when said stud is tilted to its extreme angular position.

2. The ball joint assembly as defined in claim 1, wherein said auxiliary bearing surface area is generated by means mounted on said stud engaging the internal bearing surface of said socket.

3. The ball joint assembly as defined in claim 2 further including resilient pressure means urging said bearing surfaces into compressive relationship with each other.

4. A ball joint assembly comprising: a socket having at least one open end and an internal bearing surface converging toward said open end; a stud operative for rotational and pivotal movement with respect to said socket having a head positioned in said socket, and a generally cylindrical shank portion extending freely through the open end of said socket, a ball member positioned in said socket having a segmental spherical external bearing surface complementary to, and bearing against, the internal bearing surface of said socket, and an opening slidably receiving the shank portion of said stud; and an annular bearing ring mounted on said stud between the head thereof and said ball member, said ring having an inside diameter sufficiently larger than the diameter of the shank portion of said stud, thereby to permit said ring to shift transversely of the axis of said shank, and said bearing ring having an outer pheripheral portion operative to temporarily engage the internal bearing surface of said socket and provide auxiliary bearing surface area when said stud pivots to its extreme angular position with respect to said socket.

5. The ball joint assembly as defined in claim 4, wherein the outside diameter of said bearing ring is slightly greater than the largest outside diameter of said ball member.

6. The ball joint assembly as defined in claim 4 further comprising spring means operative to maintain the bearing surfaces of said assembly in compressive relationship with each other.

7. The ball joint assembly as defined in claim 4, wherein the periphery of said bearing ring is provided with a plurality of integral lobe portions operative to engage the inside wall of said socket.

References Cited

UNITED STATES PATENTS

| 2,593,253 | 4/1952 | Booth | 287—90 |
| 2,954,993 | 10/1960 | Scheublein et al. | 287—90 |
| 3,239,256 | 3/1966 | Carter | 287—87 |

FOREIGN PATENTS

| 604,383 | 7/1948 | Great Britain. |

CARL W. TOMLIN, *Primary Examiner.*

A. KUNDRAT, *Assistant Examiner.*